(12) United States Patent
Joubert et al.

(10) Patent No.: US 12,406,568 B2
(45) Date of Patent: Sep. 2, 2025

(54) SECURITY SYSTEM WITH CLOUD-BASED CONTROLLER

(71) Applicant: FIDELITY ADT (PTY) LIMITED, Midrand (ZA)

(72) Inventors: Johannes Willem Jakobus Joubert, Pretoria (ZA); Carel Lourens Wessels, Pretoria (ZA)

(73) Assignee: FIDELITY ADT (PTY) LIMITED, Midrand (ZA)

( * ) Notice: Subject to any disclaimer, the term of this patent is extended or adjusted under 35 U.S.C. 154(b) by 0 days.

(21) Appl. No.: 16/956,078

(22) PCT Filed: Dec. 10, 2018

(86) PCT No.: PCT/IB2018/059816
§ 371 (c)(1),
(2) Date: Jun. 19, 2020

(87) PCT Pub. No.: WO2019/123091
PCT Pub. Date: Jun. 27, 2019

(65) Prior Publication Data
US 2020/0320853 A1 Oct. 8, 2020

(30) Foreign Application Priority Data
Dec. 20, 2017 (ZA) .................. 2017/08671

(51) Int. Cl.
*G08B 25/10* (2006.01)
*G16Y 10/75* (2020.01)
(Continued)

(52) U.S. Cl.
CPC .............. *G08B 25/10* (2013.01); *H04L 67/10* (2013.01); *G16Y 10/75* (2020.01); *G16Y 40/10* (2020.01); *G16Y 40/50* (2020.01)

(58) Field of Classification Search
CPC ........ G08B 25/10; H04L 67/10; G16Y 10/75; G16Y 40/10; G16Y 40/50
See application file for complete search history.

(56) References Cited

U.S. PATENT DOCUMENTS 10,554,758 B2 * 2/2020 Barry ................... G08B 25/10
10,735,249 B2 * 8/2020 Baum ................ H04L 41/0846
(Continued)

FOREIGN PATENT DOCUMENTS

EP        3093827 A1    11/2016
JP    2016-177545 A    10/2016
(Continued)

OTHER PUBLICATIONS

International Searching Authority, International Search Report and Written Opinion for International Application No. PCT/IB2018/059816, Apr. 9, 2019, (11 pages), European Patent Office, Rijswijk, Netherlands.

(Continued)

*Primary Examiner* — Quan Zhen Wang
*Assistant Examiner* — Mancil Littlejohn, Jr.
(74) *Attorney, Agent, or Firm* — Alston & Bird LLP

(57) ABSTRACT

The self-contained security device 12.1 comprises a sensor element 13 and a processor 14 connected to the sensor element for generating an intrusion message in response to a signal from the sensor element. An Internet of things (IoT) transmitter 16 is connected to the processor 14 for transmitting to a cloud-based controller 19 the intrusion message via an Internet of things communications path 18 which is provided by an Internet of things network.

12 Claims, 3 Drawing Sheets

(51) Int. Cl.
*G16Y 40/10* (2020.01)
*G16Y 40/50* (2020.01)
*H04L 67/10* (2022.01)

(56) References Cited

U.S. PATENT DOCUMENTS

| | | | |
|---|---|---|---|
| 11,159,622 B2* | 10/2021 | Skaaksrud | G06Q 10/0833 |
| 2010/0201515 A1* | 8/2010 | Fleming | H04L 67/125 |
| | | | 340/539.22 |
| 2014/0085093 A1* | 3/2014 | Mittleman | G08B 21/14 |
| | | | 29/832 |
| 2014/0266669 A1* | 9/2014 | Fadell | G08B 19/00 |
| | | | 340/501 |
| 2015/0061859 A1* | 3/2015 | Matsuoka | G08B 25/008 |
| | | | 340/501 |
| 2015/0115711 A1* | 4/2015 | Kouroussis | G06F 1/3206 |
| | | | 307/23 |
| 2016/0249281 A1* | 8/2016 | Sahni | H04W 52/0235 |
| 2016/0337720 A1* | 11/2016 | Krishnamurthy | H04W 84/18 |
| 2017/0169688 A1* | 6/2017 | Britt | G08B 25/10 |
| 2017/0187807 A1* | 6/2017 | Clernon | H04L 67/34 |
| 2018/0247515 A1* | 8/2018 | Brady | H04W 4/38 |

FOREIGN PATENT DOCUMENTS

| | | |
|---|---|---|
| JP | 2017-038205 A | 2/2017 |
| WO | WO02017/052578 A1 | 3/2017 |

OTHER PUBLICATIONS

Japanese Office Action for Patent Application No. 2020-554959, dated Dec. 27, 2022, (5 pages), Tokyo, Japan.

* cited by examiner

SECURITY SYSTEM WITH CLOUD-BASED CONTROLLER

CROSS REFERENCE TO RELATED APPLICATIONS

This application is a National Stage Application, filed under 35 U.S.C. § 371, of International Application No. PCT/IB2018/059816, filed Dec. 10, 2018, which claims priority to South Africa Application No. 2017/08671, filed Dec. 20, 2017; the contents of both of which as are hereby incorporated by reference in their entirety.

BACKGROUND

Related Field

DESCRIPTION OF RELATED ART

This invention relates to a security device, a security system and to a method of protecting a user station.

Security systems are generally used at user stations, such as residential and commercial properties, to detect unauthorised entry at the station and to alert a security service provider, normally operating from a central backend, thereby to protect property at the station from theft as well as to provide personal protection.

The known security systems utilise a local controller at the station. The controller comprises a plurality of inputs which are connected to a plurality of intrusion sensors which are distributed at the station. When one of the intrusion sensors senses an intrusion, an alarm is activated by the controller. An intrusion message is transmitted by the local controller from the user station to the remote central backend via a conventional telephone line utilising a connection typically referred to as a "tip and ring" connection. Alternatively, a Global System for Mobile Communications (GSM) modem is utilised to transmit the intrusion message to the backend. These GSM modems may be jammed by intruders and the telephone line may be compromised.

Furthermore, these local controllers and associated equipment need to be installed and programmed at the user station. This installation process is technical and therefore a skilled technician or relevant expert is generally required to perform the installation, which may be both inconvenient to and expensive for the user. Hence, these known security systems may not be suitable for at least some applications.

BRIEF SUMMARY

Accordingly, it is an object of the present invention to provide a security device, a security system and a method of protecting a user station with which the applicant believes the aforementioned problems may at least be alleviated or which may provide a useful alternative for the known systems and/or devices.

According to a first aspect of the invention there is provided a security device comprising:
  a sensor element;
  a processor connected to the sensor element for generating a first message in response to a signal from the sensor element; and
  an Internet of things transmitter connected to the processor for transmitting to a cloud-based controller the first message via an Internet of things communications path provided by an Internet of things network.

The Internet of things (IoT) is known in the art and comprises a network of things. These things typically comprise at least one of associated electronics, software, sensors and actuators. The things all have network connectivity, enabling them to connect and exchange data with one another and/or with a central backend over the Internet. Preferably, each thing forming part of the IoT network is uniquely identifiable in the IoT network. The IoT network typically comprises network dedicated IoT high sites.

Hence, the security device may be assigned a unique identification number (ID) for use in communications via the network.

The sensor element may comprise any one of a) an intrusion sensor, such as any one of: a passive infrared sensor, a contact sensor for a door or window, photoelectric beam, a panic button or other operable button, a magnetic lock sensor, a strike lock sensor; and b) another sensor, such as a temperature sensor, a smoke sensor, a water or moisture sensor/detector etc. These sensors may be normally open or normally closed sensors.

The first message may be an intrusion message comprising data derived from a signal from an intrusion sensor, alternatively the first message may be a warning message comprising data derived from a signal from at least one of the other sensors, such as a temperature sensor, a smoke sensor, a water or moisture sensor etc.

The security device may comprise a local power supply, preferably in the form of a replaceable battery, providing an output voltage. The battery may be rechargeable. The power supply is preferably dedicated and local to the security device.

The processor may be configured to incorporate, into the first message, data relating to a current output voltage of the battery The security device may comprise a position determining device.

The position determining device may be configured to generate position data and the processor may be configured to incorporate in the first message the position data.

The security device may comprise an IoT receiver for receiving a second message, such as an instruction or command message, from the cloud-based controller via the IoT network.

The IoT transmitter and IoT receiver may be combined in an IoT transceiver.

At least the sensor element, processor, transmitter and power supply may be housed in a single housing for the security device. The housing may be dedicated to the security device. Preferably, all of the sensor element, processor, transmitter, receiver, position determining device and power supply are housed in the single housing.

The security device is hence self-contained and portable or transportable between different locations.

According to a second aspect of the invention there is provided a security system comprising:
  at least one security device comprising:
    a sensor element;
    a processor connected to the sensor element for generating a first message in response to a signal from the sensor element; and
    an Internet of things transmitter connected to the processor for transmitting the first message via an Internet of things communications path; and
  a cloud-based controller for the security system which is in data communication with the at least one security device via the Internet of things communications path.

The at least one security device may be as defined above.

The cloud-based controller may be configured to perform at least some of the control functions which are conventionally associated with a local controller or control box of a conventional security system.

The security system may be associated with a first user station, the at least one security device may, in use, be deployed at the first user station and the cloud-based controller may be hosted at a remote central backend.

The cloud-based controller may be hosted on at least one server at the backend. The backend may be housed at a single physical site or may be distributed over a plurality of distributed physical sites.

The security system may comprise a terminal which is associated with the first user station, the terminal being configurable to be in communication with the cloud-based controller and may be user operable to configure settings of the cloud-based controller.

The terminal may be in the form of a mobile device, such as a smartphone, comprising a processor, an associated memory arrangement and a display.

The system may comprise a computer application program (app) which is stored in the memory arrangement and, in use, is executed by the processor to present a user interface (UI) on the display of the terminal, and in response to commands entered via the UI to configure the settings of or to program the cloud-based controller.

The system may comprise a plurality of the security devices, which may be located in distributed locations at the first user station.

Each of the plurality of security devices may be configured independently to communicate via its respective IoT transmitter or transceiver with the cloud-based controller.

Furthermore, any one of the plurality of security devices may be configured to communicate via its respective IoT transmitter or transceiver with any other one or more of the plurality of security devices.

The backend may host a respective cloud-based controller for each of a plurality of distributed user stations, each respective cloud-based controller forming part of a respective security system as defined above.

The backend may comprise a database which comprises data associated with the user stations, including data relating to the unique ID's of the security devices.

According to a third aspect of the invention there is provided a method of protecting a user station, the method comprising:
 at a cloud-based controller for a security system associated with the user station, receiving from a security device located at the user station an intrusion message via an Internet of things network; and
 causing the controller to act on the intrusion message in accordance with settings or rules which are pre-stored on the controller.

BRIEF DESCRIPTION OF THE FIGURES

The invention will now further be described, by way of example only, with reference to the accompanying diagrams wherein.

DETAILED DESCRIPTION OF VARIOUS EMBODIMENTS

Figure 1:
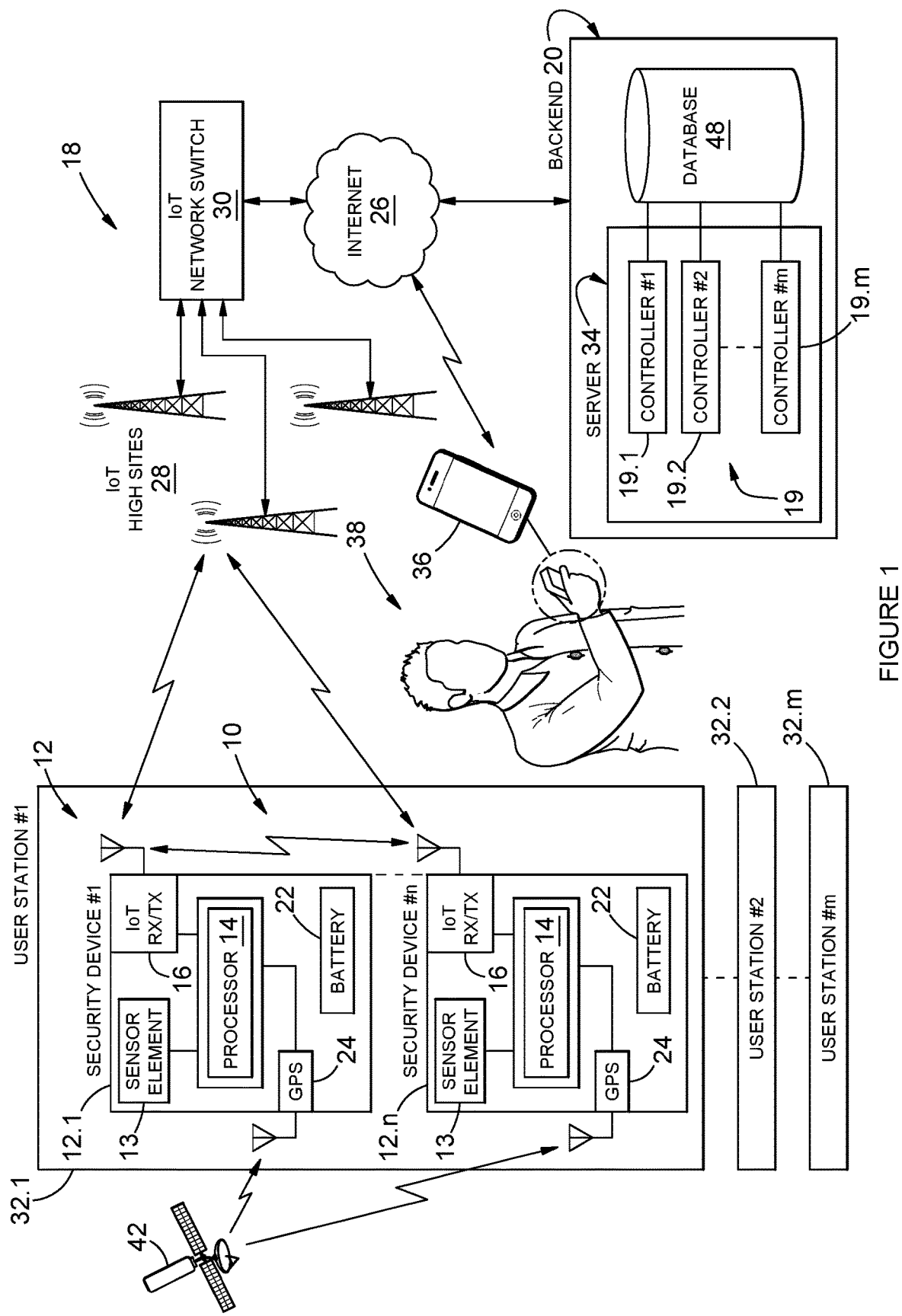
FIG. 1 is a high-level block diagram of an example embodiment of a security system.
Figure 2:
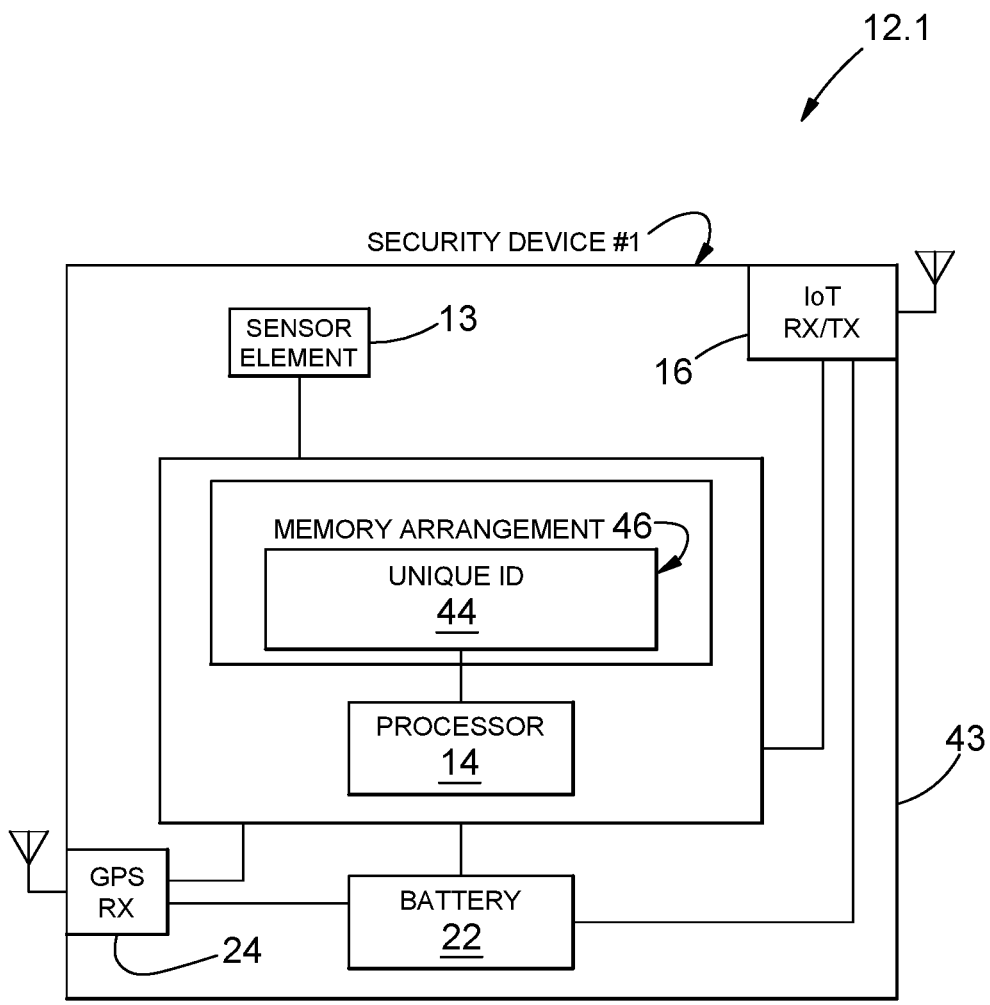
FIG. 2 is a block diagram of an example embodiment of a security device forming part of the security system.

An example embodiment of a security system is generally designated by the reference numeral 10 and an example embodiment of a self-contained security device is generally designated by the reference numeral 12.1 in FIGS. 1 and 2.

The self-contained security device 12.1 comprises a sensor element 13 and a processor 14 connected to the sensor element 13 for generating a first message in response to a signal from the sensor element 13. An Internet of things (IoT) transmitter 16 is connected to the processor 14 for transmitting the first message to a cloud-based controller 19 via an IoT communications path 18 provided by an IoT network. The cloud-based controller 19 is preferably hosted at a remote central backend 20. The security device 12.1 further comprises an IoT receiver. The IoT transmitter and the IoT receiver may be combined in an IoT transceiver 16.

The self-contained security device 12.1 comprises a local power supply, preferably in the form of a replaceable battery 22 which provides an output voltage. The battery 22 may be rechargeable. The security device 12.1 also comprises a position determining device 24 which is configured to generate position data and the processor 14 is configured to incorporate the position data into the first message.

The sensor element 13 may comprise any one of: a) an intrusion sensor, such as a passive infrared sensor, a contact sensor for a door or window, photoelectric beam, a panic button or other operable button, a magnetic lock sensor, a strike lock sensor; and b) another sensor, such as a temperature sensor, a smoke sensor, a water or moisture sensor/detector etc. These sensors may be normally open or normally closed sensors.

The first message may be an intrusion message comprising data derived from a signal from an intrusion sensor, alternatively the first message may be a warning message comprising data derived from a signal from at least one of the temperature sensor, smoke sensor, water or moisture sensor etc.

In FIG. 1 is shown the security system 10 which comprises a plurality of security devices 12.1 to 12.*n*. The security devices 12.1 to 12.*n* are similar to one another. The central backend 20 is in communication with each of the security devices 12.1 to 12.*n* individually via the IoT communications path 18 and via the Internet 26. The IoT communications path 18 comprises at least one IoT high site 28 which is connected to the Internet 26 via an IoT network switch 30.

The IoT transceiver 16 is preferably a narrow-band type transceiver which transmits the first message via the IoT communications path 18. The IoT communications path 18 is preferably provided by an IoT network for example one of the networks which are marketed under the trademarks 'SIGFOX'™ or "LoRaWAN"™ which respectively provides a Low-power Wide-area network (LPWAN). The IoT network switch 30 enables connection to the Internet 26 and a webserver (not shown) performs a signal exchange step between the Internet 26 and the backend 20.

The security system 10 is associated with a first user station 32.1, where the security devices 12.1 to 12.*n* are deployed in distributed locations at the first user station 32.1. Further similar security systems may be provided for further user stations 32.2 to 32.*m*.

The cloud-based controller 19 is preferably hosted on a server 34 at the remote central backend 20. The backend 20 may be housed at a single physical site or may be distributed over a plurality of distributed physical sites. The backend 20 hosts a respective cloud-based controller 19.1 to 19.m associated with the respective security systems at each of the plurality of distributed user stations 32.1 to 32.m. The systems associated with the user stations 32.1 to 32.m are similar and hence the system 10 associated user station 32.1 only will be described in further detail below.

The security system 10 further comprises a terminal which is associated with the first user station 32.1. The terminal is configurable to be in communication with the cloud-based controller 19.1. The terminal is user operable to configure settings of the cloud-based controller 19.1 via the Internet 26. The terminal is preferably in the form of a mobile device 36 of a user 38, the mobile device 36 comprising a processor, an associated memory arrangement and a display (shown in FIG. 3). The system 10 still further comprises a computer application program (app) which is stored in the mobile device memory arrangement and, in use, is executed by the mobile device's processor to present a user interface (UI) 40 on the display of the terminal, and in response to commands entered via the UI 40 to configure the settings of the cloud-based controller 19.1. Hence, the user 38 is enabled to control the security devices 12.1 to 12.n via the IoT communications path 18.

Any one of the plurality of security devices 12.1 to 12.n may be configured to communicate via its respective IoT transmitter or transceiver 16 with any other one or more of the other security devices 12.1 to 12.n at the user station 32.1.

In FIG. 2 is shown the security device 12.1 in more detail. The position determining device 24 is preferably in the form of a Global Positioning System (GPS) device or a Russian Global Navigation Satellite System (GLONASS) device or any other position determining device for determining the position of the security device 12.1 utilizing satellites 42 (shown in FIG. 1) in known manner. The sensor element 13, processor 14, transmitter or transceiver 16, position determining device 24 and power supply 22 may be housed in a single sensor device housing 43 (shown in FIG. 2). The security device 12.1 is hence self-contained and portable or transportable between different locations at user station 32.1 or between user stations 32.1 to 32.m.

The processor 14 is configured to incorporate the position data into the first message, in the form of an intrusion message, which is transmitted to the backend 20 via the IoT communications path 18. The position data may be incorporated into the intrusion message repetitively or only at certain predetermined time intervals. A clock (not shown) may be utilised in determining the time intervals. Alternatively, the position data may be transmitted by the IoT transceiver 16 in a so-called "heartbeat message" for example every 10 minutes or at any other suitable time. The "heartbeat message" may in addition comprise data relating to a current output voltage of the battery 22 and data relating to a unique identification (ID) number 44 of the security device 12.1 which uniquely identifies the device on the IoT network 18. The data relating to the unique ID of the security device 12.1 is preferably pre-stored into a memory arrangement 46 associated with the security device 12.1. The user 38 may for example be alerted of a low battery voltage of one of the security devices 12 via the app on the mobile device 36.

Figure 3:
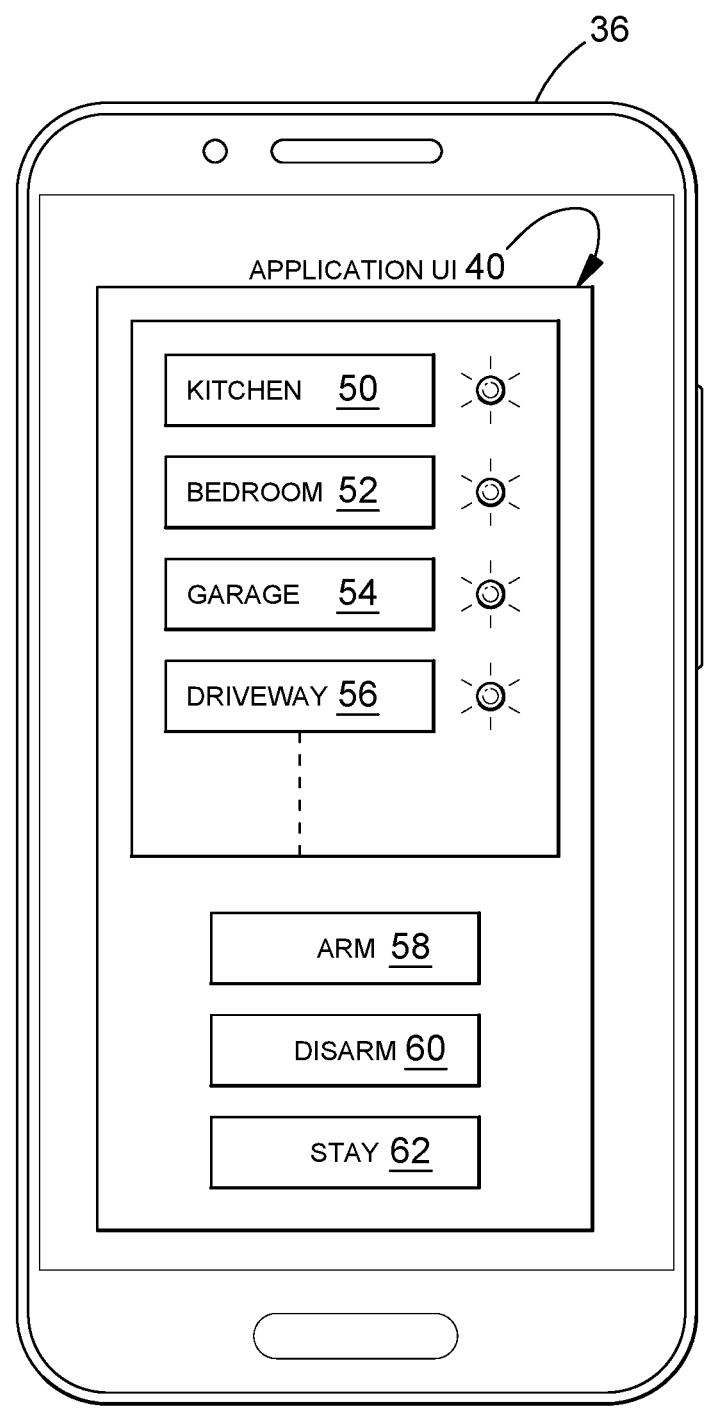
FIG. 3 is a diagrammatic representation of a user interface (UI) presented by an application running on a mobile device forming part of the security system.

In FIG. 3 is shown the mobile device 36 of the user 38 in more detail. The user 38 is prompted by the app to register at the backend 20, each of the security devices 12.1 to 12.n which are associated with the user station 32.1 of the user 38.

Referring again to FIG. 1, the backend 20 comprises the cloud-based controller 19.1 which is hosted by the server 34. The backend 20 also comprises a database 48. The above registration by the user via the UI 40 on mobile device 36 involves entering into and storing of data relating to the user 38, data relating to the user station 32.1 and data relating to the unique ID's of the first user station's associated security devices 12.1 to 12.n on database 48 at backend 20. The registration process may comprise scanning a code associated with each respective security device 12.1 to 12.n such as a bar code or a "QR code"™ when the user 38 is logged into a user account via the app. It will be appreciated that a plurality of users 38.1 to 38.m may be registered in this manner at the backend 20, for respective user stations 32.1 to 32.m.

In use, the user 38 purchases one or more of the security devices 12.1 to 12.n, installs them at the user station 32.1 and registers them at the backend 20. Referring to FIG. 3, the user is enabled to configure settings of the cloud-based controller 19.1 via the UI 40. Hence, the user 38 is enabled to control the security devices 12.1 to 12.n via the app and via the IoT communications path 18. The user 38 may utilise the UI 40 to assign each of the security devices 12 an appropriate name, for example kitchen 50, bedroom 52, garage 54, driveway 56, etc. The user 38 is also enabled to activate or deactivate (by-pass) each of the security devices 12.1 to 12.n individually via the UI 40. Some of the security devices 12.1 to 12.n may also be grouped together, for example security devices 12.1 to 12.3 may be assigned to the kitchen 50, security devices 12.4 to 12.6 to the bedroom 52 etc. A user may use buttons 58, 60 and 62 on the UI 40 to cause the cloud-based controller 19.1 to operate in a user selectable ARM mode, a DISARM mode and a STAY mode, subject to the user bypass selections referred to above.

The backend 20 may also be configured to alert the user 38 via the app when one of the security devices 12.1 to 12.n is activated or when the GPS device 24 provides position data indicating that the security device 12.1 is located outside a geographical coverage area of an operator of the backend 20.

It will be appreciated that there are many variations in detail on the security device, security system, and associated method without departing from the scope and spirit of this disclosure.

The system 10 provides multiple redundancies and robustness in that when one of the security devices such as security device 12.1 has limited or no connectivity to the IoT network 18, the respective device is enabled to transmit the intrusion message to one of the other security devices 12.2 to 12.n which device then forwards the intrusion message to the backend 20 via the IoT communications path 18.

Apart from a first message in the form of an intrusion message, the above other sensors may output signals which may be used to generate a first signal in the form of a warning message. For example, leaks of a water heater (also referred to as a "geyser") may be monitored utilising a water detector. In this case, the processor 14 may be configured, in the event of a water leak, to transmit to the backend 20 via the IoT communications path 18, a warning or other message comprising data relating to a detected leak and position data. It will be appreciated that these other messages may comprise data associated with any of the other sensors, with or without position data.

A further position determining device (not shown) may be associated with the mobile device 36 and the system 10 may be configured such that when the mobile device 36 is located in, alternatively, outside a predefined geographical region (sometimes referred to as "geo-fencing"), one or more of the security devices 12.1 to 12.n and/or modes may automatically be enabled or disabled by the cloud-based controller 19.1.

The invention claimed is:

1. A security system comprising:
    at least one security device at a first user station, the at least one security device comprising:
        a portable housing;
        a local power supply for providing an output voltage;
        a sensor element;
        a processor connected to the sensor element for generating a first message in response to a signal from the sensor element; and
        an Internet of things transmitter connected to the processor;
    a cloud-based controller for the security system, the cloud-based controller being hosted on a server at a central backend that is positioned at a location remote from the user station, the cloud-based controller being in data communication with the at least one security device via an Internet of things communications path, the cloud-based controller having an arm mode of operation and a disarm mode of operation;
    a terminal associated with the first user station, the terminal being configured to be in communication with the cloud-based controller to cause the cloud-based controller to operate in a user selectable one of the arm mode of operation or the disarm mode of operation, and the terminal being operable to configure settings of the cloud-based controller to cause the cloud-based controller to act on the first message in accordance with one or more settings pre-stored on the cloud-based controller,
    wherein:
        the Internet of things transmitter is a narrow-band transmitter configured to transmit the first message directly to a high site, external of the user station, of a Low-power Wide-area network providing the Internet of things communications path;
        the local power supply comprises at least one replaceable battery;
        the sensor element, the processor, the narrow-band transmitter, and the at least one replaceable battery are housed in the portable housing of the at least one security device; and
        the at least one security device is wholly self-powered and self-contained, as well as portable and transportable between different locations at the user station and between the user station and another user station.

2. The security system as claimed in claim 1, further comprising a memory arrangement connected to the processor and for storing a unique identification number (ID) associated with the device and for use in communications via the network.

3. The security system as claimed in claim 1, wherein the sensor element comprises any one of: a passive infrared sensor, a contact sensor for a door or window, a photoelectric beam, a panic button or other user operable button, a magnetic lock sensor, a strike lock sensor, a temperature sensor, a smoke sensor and a water or moisture sensor.

4. The security system as claimed in claim 1, wherein the processor is configured to incorporate, into the first message, data relating to a current output voltage of the power supply.

5. The security system as claimed in claim 1, further comprising a position determining device which is connected to the processor.

6. The security system as claimed in claim 5, wherein the processor is configured to incorporate, into the first message, position data as determined by the position determining means.

7. The security system as claimed in claim 1, further comprising an Internet of things receiver connected to the processor and for receiving a second message from the cloud-based controller via the Internet of things network.

8. The security system as claimed in claim 1, wherein the terminal is a mobile device comprising a processor, an associated memory arrangement, and a display.

9. The security system as claimed in claim 8, further comprising a computer application stored in the memory arrangement, the computer application being, in use, executed by the processor to present a user interface on the display of the terminal and, in response to commands entered via the user interface, to configure the settings of the cloud-based controller.

10. The system as claimed in claim 1, further comprising a plurality of the security devices which are deployable at distributed locations at the first user station.

11. A method of protecting a user station, the method comprising:
    at a cloud-based controller for a security system associated with the user station, receiving from a user terminal associated with the user station a command to cause the cloud-based controller to operate in a user selectable arm mode of operation or a user selectable disarm mode of operation and receiving from a security device located at the user station a first message, the first message being transmitted by a narrow-band Internet of things transmitter directly to a high site, external of the user station, of a Low-power Wide-area network and via the network to the cloud-based controller; and
    causing the cloud-based controller to act on the first message in accordance with settings which are pre-stored on the cloud-based controller,
    wherein:
        the cloud-based controller is hosted on a server at a central backend that is positioned at a location remote from the user station;
        the security device comprises a local power supply comprising at least one replaceable battery; and
        the narrow-band Internet of things transmitter is housed with a sensor element, a processor, and the at least one replaceable battery in a portable housing, so that the security device is wholly self-powered and self-contained, as well as portable and transportable between different locations at the user station and between the user station and another user station.

12. A security device comprising:
    a portable housing;
    a local power supply for providing an output voltage;
    a sensor element;
    a processor connected to the sensor element for generating a first message in response to a signal from the sensor element; and
    an Internet of things transmitter connected to the processor,
    wherein:
        the Internet of things transmitter is a narrow-band transmitter configured to transmit the first message directly to a high site, external of the user station, of a Low-power Wide-area network and via the network to a cloud-based controller of a security system of which the security device forms part;

the local power supply comprises at least one replaceable battery; and the sensor element, the processor, the narrow-band transmitter, and the at least one replaceable battery are housed in the portable housing, so that the at least one security device is wholly self-powered and self-contained, as well as portable and transportable between different locations at the user station and between the user station and another user station.

\* \* \* \* \*